United States Patent
Kroner

[11] Patent Number: 6,063,961
[45] Date of Patent: May 16, 2000

[54] PROCESS FOR PREPARING COCONDENSATES OF ASPARTIC ACID AMINES

[75] Inventor: Matthias Kroner, Eisenberg, Germany

[73] Assignee: BASF Aktiengesellschaft, Ludwigshafen, Germany

[21] Appl. No.: 09/147,370

[22] PCT Filed: Jul. 14, 1997

[86] PCT No.: PCT/EP97/03751

§ 371 Date: Dec. 10, 1998

§ 102(e) Date: Dec. 10, 1998

[87] PCT Pub. No.: WO98/04613

PCT Pub. Date: Feb. 5, 1998

[30] Foreign Application Priority Data

Jul. 26, 1996 [DE] Germany .......................... 196 30 280

[51] Int. Cl.⁷ .......................... C07C 231/02; C08F 20/54; C08G 69/10

[52] U.S. Cl. .......................... 564/138; 525/418; 525/419; 525/420; 526/303.1; 526/304; 526/307; 526/312; 528/190; 528/327; 528/328; 528/363; 562/571

[58] Field of Search .............................. 564/138; 528/328, 528/190, 327, 363; 525/418, 419, 420; 526/303.1, 304, 307, 312; 562/571

[56] References Cited

U.S. PATENT DOCUMENTS 5,510,426  4/1996  Wood.
5,747,635  5/1998  Kroner et al. .......................... 528/328

FOREIGN PATENT DOCUMENTS

| 0 644 257 A2 | 3/1995  | European Pat. Off.. |
| WO 94/01486  | 1/1994  | WIPO. |
| WO95/21882   | 8/1995  | WIPO. |
| WO 96/00743  | 1/1996  | WIPO. |
| WO 96/05241  | 2/1996  | WIPO. |
| WO 96/35737  | 11/1996 | WIPO. |
| WO 97/09409  | 3/1997  | WIPO. |

Primary Examiner—Shailendra Kumar
Attorney, Agent, or Firm—Oblon, Spivak, McClelland, Maier & Neustadt, P.C.

[57] ABSTRACT

A process for preparing cocondensates of aspartic acid and amines by heating aspartic acid and amines in the presence of acidic catalysts comprises supplying the feed region of the extruder with particulate aspartic acid and a downstream metering zone with at least one amine and at least one acidic catalyst, condensing the resulting mixture to such an extent by heating that the downstream end of the extruder discharges a precondensate which contains at least 20–95% by weight of the starting aspartic acid in condensed form, and then completing the condensation of the precondensate. The cocondensates are useful as incrustation inhibitors in detergents.

12 Claims, No Drawings

PROCESS FOR PREPARING COCONDENSATES OF ASPARTIC ACID AMINES

This application is a 371 of PCT/EP97/03751, filed Jul. 14, 1997.

The present invention relates to a process for preparing cocondensates of aspartic acid and amines by heating aspartic acid and amines in the presence of acidic catalysts while mixing at up to 300° C. in an extruder.

WO-A-94/01486 discloses the preparation of modified polyaspartic acids. According to one version of the disclosed process, mixtures of aspartic acid and a comonomer which has at least one functional group are polycondensed at from 100 to 270° C. Examples of suitable comonomers are fatty acids, polybasic carboxylic acids, anhydrides of polybasic carboxylic acids, alcohols, amines, alkoxylated alcohols and alkoxylated amines. The polycondensation is effected in the presence of acidic catalysts, for example phosphoric acid, hydrochloric acid or sulfuric acid. The polycocondensates are used as additives in washing and cleaning compositions, for example.

WO-A-96/05241 discloses a process for preparing polyaspartic acid by polycondensation of finely divided aspartic acid at above 150° C. in the presence of acidic catalysts. It is not until the reaction zone that the acidic catalysts first come into contact with the aspartic acid which has been heated to at least 150° C. The acidic catalysts are preferably sprayed onto the surfaces of the fine aspartic acid particles in such a way that no tacky solutions are produced thereon. This avoids the formation of an aggregated or clumped polymer mass.

Prior DE application 19 517 715.0, unpublished at the priority date of the present invention, discloses a process for preparing polycocondensates of aspartic acid by adding a catalytic acid and at least one comonomer to a hot aspartic acid at 150–210° C. in such a way that the formation of tacky solutions is avoided. The cocondensation is preferably effected in a fluidized bed.

EP-A-0 644 257 discloses a process for the thermal polycondensation of aspartic acid in the presence of acidic catalysts. The polycondensation can optionally take place in the presence of polyfunctional monomers such as diamines or polyamines. It is effected within the temperature range from 110 to 300° C. under intensive mixing of the reactants, for example in a single- or multiple-screw extruder. The product obtained is a finely divided, optionally modified, polyaspartic acid containing more than 80% of the starting aspartic acid in condensed form.

The above-described processes have the disadvantage that amine comonomers give rise to particularly tacky reaction masses which are very difficult to handle.

It is an object of the present invention to provide an improved process for preparing cocondensates of aspartic acid and amines.

We have found that this object is achieved by this invention by a process for preparing cocondensates of aspartic acid and amines by heating aspartic acid and amines in the presence of acidic catalysts while mixing at up to 300° C. in an extruder, which comprises supplying the feed region of the extruder with particulate aspartic acid and a downstream metering zone with at least one amine and at least one acidic catalyst, condensing the resulting mixture to such an extent by heating that the downstream end of the extruder discharges a precondensate which contains at least 20–95% by weight of the starting aspartic acid in condensed form, and then completing the condensation of the precondensate at from 150 to 300° C.

The aspartic acid used can be L-, DL- or D-aspartic acid or a mixture thereof. The aspartic acid can have any desired crystal size and crystal form. The average particle diameter of the aspartic acid crystals can be for example from 0.01 to 5, preferably from 0.1 to 2, mm.

The finely divided aspartic acid is condensed with primary, secondary or tertiary amines. Preference is given to using alkylmonoamines having up to 100 carbon atoms in the alkyl chain. Particular preference is given to primary and secondary alkylmonoamines having from 1 to 30 carbon atoms for use as cocondensable compounds. Examples of such amines are tallow fatty amine, hydrogenated tallow fatty amine, octylamine, 2-ethylhexylamine, nonylamine, decylamine, 2-propylheptylamine, undecylamine, dodecylamine, tridecylamine, cetylamine, stearylamine, palmitylamine, oleylamine, coconut fatty amine, mono-α-branched secondary amines, bis-α-branched secondary amines of the general formula $R^4R^3HC-HN-CHR^1R^2$, where $R^1$, $R^2$, $R^3$ and $R^4$ are each independently of the others substituted or unsubstituted $C_{1-20}$-alkyl.

The amount of amine used per mole of aspartic acid extends for example from 1 to 40, preferably from 1 to 20, % by weight.

Examples of suitable acidic catalysts include phosphoric acid, phosphorous acid, phosphonic acids, diphosphoric acid, triphosphoric acid, more highly condensed phosphoric acids, sulfuric acid, ammonium hydrogen sulfate, sodium hydrogen sulfate and potassium hydrogen sulfate. In some cases, mixtures of acidic catalysts have advantages. For instance, low melting mixtures of ammonium hydrogen sulfate, sodium hydrogen sulfate and potassium hydrogen sulfate or mixtures of sodium hydrogen sulfate and potassium hydrogen sulfate are used. Also suitable are trimethylammonium hydrogen sulfate and triethylammonium hydrogen sulfate as acidic catalysts. Particular preference is given to using phosphoric acid. The amount of acidic catalyst used per mole of aspartic acid ranges for example from 1 to 40, preferably 5 to 30, % by weight. Particularly preferred cocondensates are prepared by cocondensation of aspartic acid with tallow fatty amine and phosphoric acid.

The cocondensation is carried out in a two-stage process. In the first process stage, aspartic acid, amine and acidic catalyst are mixed in an extruder by input of mechanical energy. For this purpose, the feed region of the extruder is supplied with particulate aspartic acid and a downstream metering zone with at least one amine and at least one acidic catalyst. The mixing of the components can be effected at from 20 to 250° C., preferably at from 50 to 150° C. The input of mechanical energy into the system and the heat of neutralization released in the course of the coming together of amine and acidic catalyst serve to heat up the mixture. The mixture is condensed to such an extent by heating to the condensation temperature, which ranges for example from 150 to 300° C., preferably from 180 to 280° C., that the downstream end of the extruder discharges as a precondensate containing at least 20–95% by weight of the starting aspartic acid in condensed form. The condensation is preferably carried on to such an extent that the downstream end of the extruder discharges a precondensate containing at least 40% by weight of the starting aspartic acid in condensed form. Depending on the degree of condensation, the downstream end of the extruder discharges reaction mixtures which have the consistency of viscous melts or—if the degrees of condensation are above 40%—are solid even under the temperature conditions of the condensation and are present in the form of friable, nontacky materials.

The cocondensation is preferably effected continuously by supplying the extruder with the starting materials batchwise or continuously and the downstream end of the extruder discharging the same amount of precondensate. The residence time in the extruder depends on the level of condensation product (=degree of condensation of the aspartic acid) desired in the precondensates. The residence times of the reaction mixture in the extruder range for example from 0.1 to 30, preferably from 0.2 to 10, min.

In the second process stage, the precondensates obtained in the first stage are condensed to completion. The degrees of condensation achieved for the aspartic acid are then more than 98%, preferably 100%. The condensation in the second process stage is preferably effected by heating the precondensates, distributed over a heated surface, at from 150 to 300° C., preferably at from 180 to 250° C., for from 0.5 to 300, preferably from 1 to 120, min. Suitable equipment for this operation includes for example heating belts, kneaders, mixers, paddle dryers, extruders, rotary tube furnaces and other heatable apparatus in which the condensation of solids can be carried out by removal of water of reaction.

The condensation in the first stage and the postcondensation in the second stage can be carried out at atmospheric pressure, under superatmospheric pressure or else under reduced pressure, for example within the pressure range from 1 to 200 mbar. The components are preferably condensed under atmospheric pressure. The postcondensation is preferably carried out on a heatable belt by applying the precondensate thereto, for example in a layer thickness of from 0.1 to 10, preferably from 0.5 to 5, cm and heating at from 150 to 300° C., preferably from 180 to 250° C., to complete the condensation. The degrees of condensation in the second process stage are dependent on the selected temperature, the residence time and the degree of condensation of the precondensate. In the second process stage, the degree of condensation of the precondensate is increased. The entire aspartic acid can be condensed, so that the degree of condensation is 100%. However, it is similarly possible to set degrees of condensation in the second process stage which range from 69 to 99%, preferably from more than 95 to 100%. The aspartic acid not condensed into the cocondensate can be extracted from the cocondensate by washing with water or with dilute acids. However, it may also remain in the polycondensate. This procedure is preferred for practice in industry. To work up the cocondensates, they are extracted with from 1 to 10 times, preferably from 1.5 to 4 times, the amount of water and thereafter, in the form of a slurry in water, hydrolyzed at for example pH 8–10 by addition of sodium hydroxide solution. This converts the succinimide units of the cocondensates into sodium aspartate units. The salts of polyaspartic acid are soluble in water. The cocondensates will contain from 0.1 to 20, preferably from 0.5 to 10, % by weight of phosphorus when phosphorus acids are used. The cocondensed phosphorus compounds are not water- or base-extractable from the cocondensate.

The cocondensates prepared by the process of this invention are very effective incrustation inhibitors in detergents. They are particularly useful for manufacturing detergents which comprise less than 25% by weight of sodium phosphate, calculated as trisodium polyphosphate, or which are phosphate-free. The cocondensates prepared by the process of this invention are preferably used together with zeolites for manufacturing phosphate-free detergents. The detergents comprise for example from 0.2 to 10, preferably from 0.5 to 5, % by weight of the cocondensates.

The percentages in the Examples are by weight, unless otherwise indicated.

EXAMPLES

The feed region of an extruder was meteringly supplied with L-aspartic acid having a particle size of about 0.5 mm in diameter and the subsequent metering zone of the extruder separately with molten tallow fatty amine and 75% strength aqueous phosphoric acid. The quantities used in each example are shown in the table. The metering zone temperature was 80° C. In the downstream heating zone of the extruder the mixture was heated to 200–270° C. At the extruder outlet the precondensate was obtained either as a soft paste or as a hard, friable mass. The residence time of the reaction mixture in the extruder was adjusted by varying the throughput. Condensates prepared at from 250 to 270° C. and throughputs from 2.3 to 5 kg/h were solid and friable even in the hot state. Notwithstanding the high temperatures, the condensates remained pale yellow.

To determine the degree of condensation, the cocondensates were washed with water and the insoluble residue was determined. The experimentally determined polycondensate quantity was expressed as a proportion of the arithmetically expected polycondensate quantity (degree of condensation on exit from extruder in % of theory).

The reaction conditions and the degree of condensation are reported in the table. The cocondensate in Example 1 had a soft tacky consistency on exit from the extruder. Examples 2 to 9 produced a hard friable product.

To complete the condensation of the precondensates prepared in the first process stage, 100 g of each of the precondensates was heated at 180° C. for one hour. Thereafter the degree of condensation was determined by means of the above-described extraction. The condensates had molar masses $M_w$ of about 8.000 (determined by the light scattering method).

TABLE

| Ex. No. | Phosphoric acid [%], based on aspartic acid | Tallow fatty amine [%], based on aspartic acid | Temperature at extruder outlet [° C.] | Throughput (kg/h) | Degree of condensation on exit from extruder [%] | Degree of condensation after heating at 180° C. [%] |
|---|---|---|---|---|---|---|
| 1 | 20 | 10 | 200 | 5.46 | 55 | 100 |
| 2 | 15 | 5 | 200 | 5 | 60 | 100 |
| 3 | 15 | 5 | 250 | 5 | 64 | 100 |
| 4 | 15 | 5 | 250 | 5 | 61 | 100 |
| 5 | 15 | 5 | 250 | 2.5 | 70 | 100 |
| 6 | 15 | 5 | 270 | 2.5 | 76 | 100 |
| 7 | 20 | 10 | 250 | 2.73 | 80 | 100 |
| 8 | 20 | 10 | 270 | 2.73 | 94 | 100 |
| 9 | 7.5 | 5 | 270 | 2.3 | 50 | 69 |

We claim:

1. A process for preparing cocondensates of aspartic acid and amines comprising:
   a) mixing and heating particulate aspartic acid and amines up to 300° C. in the presence of an acidic catalyst, and discharging a product which contains at least 20–95% by weight of the starting acidic acid in condensed form;
   b) condensing said discharged product obtained in a) by heating at 150 to 300° C.

2. The process of claim 1, wherein the mixing is in a extruder and the extruder comprises a feed region that is supplied with particulate aspartic acid and a downstream metering zone which contains at least one amine and at least one acidic catalyst.

3. The process of claim 1, wherein the aspartic acid is selected from the group consisting of L-aspartic acid, D,L-aspartic acid, D-aspartic acid, and mixtures thereof.

4. The process of claim 1, wherein the amine is alkylmonoamine.

5. The process of claim 1 wherein the amine is selected from the group consisting of hydrogenated tallow fatty amine, octylamine, 2-ethylhexylamine, nonylamine, decylamine, 2-propylheptylamine, undecylamine, dodecylamine, tridecylamine, cetylamine, stearylamine, palmitylamine, oleylamine, coconut fatty amine, mono-α-branched secondary amine, bis-α-branched secondary amines of the general formula:

$$R^4R^3HC-HN-CHR^1R^2$$

where $R^1$, $R^2$, $R^3$, and $R^4$ are each independently substituted or unsubstituted $C_{1-20}$ alkyl, and mixtures thereof.

6. The process as claimed in claim 2, wherein the metering zone of the extruder is supplied separately with primary or secondary alkylmonoamines and acidic catalysts selected from the group consisting of phosphoric acid, phosphorous acid, phosphoric acids, diphosphoric acid, triphosphoric acid, more highly condensed phosphoric acids, sulfuric acid, ammonium hydrogen sulfate, sodium hydrogen sulfate, potassium hydrogen sulfate and mixtures thereof.

7. The process as claimed in claim 1, wherein the amine is from 1 to 40% by weight per mole of aspartic acid and the acidic catalyst is from 1 to 40% by weight per mole of aspartic acid.

8. The process as claimed in claim 1, wherein the amine is from 1 to 20% by weight per mole of aspartic acid and the acidic catalyst is from 5 to 30% by weight per mole of aspartic acid.

9. The process as claimed in claim 1, wherein the amine is tallow fatty amine and the acidic catalyst is phosphoric acid.

10. The process as claimed in claim 1, wherein the product in a) contains at least 40% by weight of the starting aspartic acid in condensed form.

11. The process as claimed in claim 1, wherein the condensing in b) is on a heatable belt in a layer thickness of from 0.1 to 10 cm with heating at 150 to 300° C.

12. The process of claim 11, wherein the heating is from 180 to 250° C.

* * * * *